Aug. 8, 1950 — C. B. MOORE — 2,518,244
PNEUMATIC CONTROL APPARATUS
Filed Oct. 2, 1943 — 2 Sheets-Sheet 2

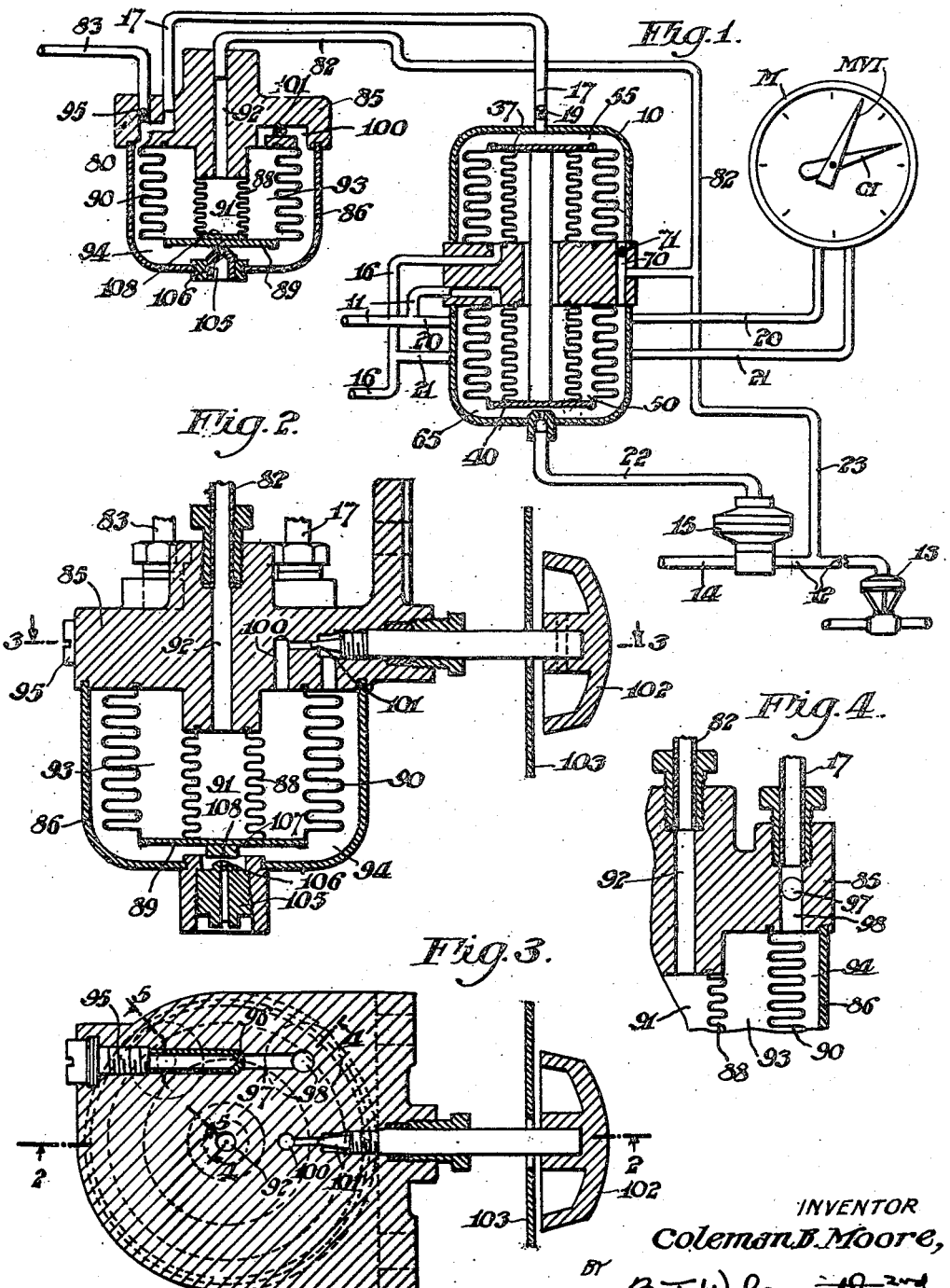

INVENTOR.
Coleman B. Moore,
BY
ATTORNEY.

Patented Aug. 8, 1950

2,518,244

UNITED STATES PATENT OFFICE 2,518,244

PNEUMATIC CONTROL APPARATUS

Coleman B. Moore, Carroll Park, Pa., assignor to Moore Products Co., Philadelphia, Pa., a co-partnership Application October 2, 1943, Serial No. 504,705

9 Claims. (Cl. 137—153)

1

This invention relates to pnuematic control apparatus and more particularly to automatic reset devices for use with air controllers.

In the operation of air controllers for effecting the operation of controlled elements such as valves and the like in accordance with changes in a measured variable control condition, such as pressure, temperature, flow or liquid level, it is frequently desirable to modify the action of the controller when the control index is away from the set point and at a rate dependent upon the amount of deviation to effect a return of the control index.

On a controlled process requiring a low sensitivity or wide throttling range to obtain stability so that a large change is necessary for a small change of the valve, controllers having such characteristics are satisfactory for use in process control where the load conditions are uniform, but if load conditions change, are particularly susceptible to drifting.

The modification of the action of the controller to return the measured variable to the correct control point upon changes in load condition is desirable to prevent drift or shift from the control point and thereby to provide stability in the process control.

In accordance with the present invention apparatus is provided for automatically effecting reset in a simple and effective manner and so that at equilibrium conditions the pressure sensitive elements are rebalanced substantially at their initial positions.

The nature and characteristic features of the invention will be more readily understood from the following description, taken in connection with the accompanying drawings forming part hereof, in which:

Figure 1 is a diagrammatic view of a pneumatic circuit in which automatic reset apparatus in accordance with the present invention is employed;

Fig. 2 is a vertical central sectional view through a preferred embodiment of the automatic reset apparatus and taken approximately on the line 2—2 of Fig. 3;

Fig. 3 is a horizontal sectional view taken approximately on the line 3—3 of Fig. 2;

Fig. 4 is a fragmentary vertical sectional view taken approximately on the line 4—4 of Fig. 3;

2

Figure 5:
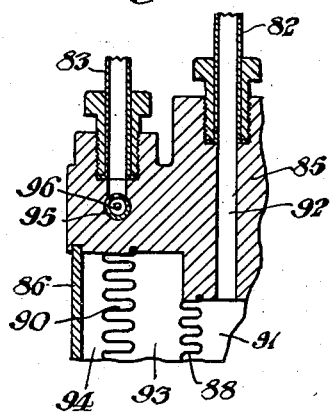
Fig. 5 is a fragmentary vertical sectional view taken approximately on the line 5—5 of Fig. 3.

It will, of course, be understood that the description and drawings herein are illustrative merely, and that various modifications and changes may be made in the structure disclosed without departing from the spirit of the invention.

Referring more particularly to Fig. 1 of the drawings the pneumatic circuit there shown by way of illustration preferably includes a controller 10, a fluid connection 11 for the delivery of fluid at the measured pressure from a transmitter (not shown) operated by the variable condition and initiating or calling for a change in control conditions, a fluid connection 12 for the delivery of fluid at a controlled transmitted or valve operating pressure to a diaphragm operated valve 13 or the like, a fluid connection 14 to a source of pressure regulated and filtered fluid, such as air, a pilot valve 15 of high sensitivity and quick response to which the supply connection 14 is joined, fluid connections 22 and 23 between the pilot valve 15 and the controller 10 and between the controlled valve pressure connection 12 and the controller 10, a fluid pressure responsive mechanism M for indicating or recording or both, a fluid connection 16 for the delivery of fluid at the control setting pressure, an automatic reset unit 80 in accordance with the present invention connected to the controller 10 by a fluid connection 17 and to the controlled valve pressure connection 12 by fluid connections 82 and 23, and a fluid connection 83 from a source of pressure regulated and filtered fluid, such as air, connected to the automatic reset unit 80. Fluid connections 20 and 21 are also provided to the fluid pressure responsive mechanism M from the measured variable pressure connection 11 and from the control setting pressure connection 16.

The pilot valve 15 may be of any preferred type having the desired characteristics, such, for example, as that shown in my prior application for Letters Patent for Pneumatic Transmission Systems, filed July 29, 1942, Serial No. 452,760 and now Patent No. 2,359,236, granted September 26, 1944.

The source of control setting pressure connected to the fluid connection 16 preferably includes a manually adjustable accurate type of pressure regulator (not shown).

The fluid pressure responsive mechanism M is preferably provided with a control setting index CI, responsive to the control setting pressure in the fluid connection 16, and a measured variable index MVI, responsive to the measured variable pressure in the fluid connection 11.

The controller 10 may be of any preferred type for applying the effect of a reset pressure, such for example as that shown in my application for Letters Patent for Pneumatic Control Apparatus, filed Sept. 29, 1943, Serial No. 504,258.

The controller 10 preferably includes a throttling range pressure chamber 55 with which the fluid connection 17 is in communication through a restriction 19 and a member 37 in said chamber 55 movable in response to the pressure applied thereon. The controller 10 preferably also includes provisions such as a chamber 50 in which the measured variable pressure in the fluid connection 11 is applied against a movable member 40, and such as a chamber 65 in which the controlled valve pressure from the pilot valve is applied against the movable member 40, and in a manner such that the forces on the movable members 37 and 40 may be combined or summed as desired. The controller 10 preferably has a needle valve 71 interposed in a passageway 70 connecting the chambers 55 and 65 for adjusting the throttling range or sensitivity. The controller 10 preferably also includes suitable provisions controlling the controlled valve pressure, such as suitabe means for acting the pilot valve 15 in accordance with the pressure resultant positioning of a movable part of the controller 10, which movable part may conveniently by the bellows assembly.

The automatic reset unit 80 is preferably a pressure regulator, automatic in its action, regulated by the controlled valve pressure with a timed delay. The unit 80 preferably includes a body portion 85 having a housing 86 secured thereto in fluid tight relationship. The body portion 85 has a flexible metallic bellows 88 secured thereto at one end in fluidtight relationship the other end of the bellows being closed by a suitable end closure 89. Another flexible metallic bellows 90 is provided, outside the bellows 88 and concentric therewith. The bellows 90 is secured at one end, in fluidtight relationship, to the body portion 85 and the other end is closed, preferably by the closure member 89. The effective areas of the bellows 88 and the bellows 90 preferably are in a predetermined ratio, as hereinafter pointed out.

A fluid pressure chamber 91 is provided within the bellows 88, and the fluid connection 82 is in communication therewith through a passageway 92. A fluid pressure chamber 93 is provided in the space between the bellows 88 and the bellows 90, and a fluid pressure chamber 94 is provided in the space between the bellows 90 and the cover 86.

The fluid connection 83 from the source of pressure regulated and filtered fluid is preferably in communication with the interior of a restriction member 95, removable for cleaning and replacement. The restriction member 95 has a constriction or restricted discharge port 96 of predetermined size for reducing the pressure of the fluid delivered through the supply connection 83. A passageway 97 is provided in the body portion 85 with which the port 96 is in communication. The passageway 97 is connected to a passageway 98, in the body portion 85, the passageway 98 being connected to the fluid connection 17 and to the chamber 90. A connecting passageway 100 is provided in the body portion 85 between the chamber 93 and the chamber 94 and flow through this passageway 100 is controlled by the setting of a needle valve 101 in accordance with the rate of correction desired. The needle valve 101 is manually adjusted by turning the knob 102, a dial 103 having suitable markings (not shown) representing values of correction rate being provided for indicating the setting of the needle valve 101.

The cover 86 has mounted at the lower portion thereof a suitable nozzle 105, having a restricted discharge port 106 of predetermined size in communciation with the atmosphere.

The bellows closure 89 has mounted thereon a suitable projection 107 having a flat control surface 108 arranged closely adjacent the discharge port 106 for controlling the flow through the discharge port 106 to the atmosphere.

The effective areas of the bellows 88 and 90 are preferably selected so that a predetermined ratio is provided. For example, the effective area of the bellows 88 may be one tenth the effective area of the bellows 90 in which case a one pound change in the pressure in the chamber 91 would be balanced by one tenth of a pound change in the pressure in the chamber 94 which permits of the use of a small operating differential between the pressures in the chambers 91 and 93.

The mode of operation of the automatic reset unit 80 in accordance with the present invention will now be pointed out. The controller 10 has measured variable pressure applied thereto through the fluid connection 11. The pilot valve 15 has fluid supplied thereto through the fluid connection 14 and pressure fluid is available in the fluid connection 22 for determining the controlled valve pressure delivered to the controller 10 through the fluid connection 12 and 23 for rebalancing and for transmission through the fluid connection 12 to the valve 13. The control setting pressure delivered through the fluid connection 16 is also effective at the controller 10.

The controlled valve pressure transmitted by the pilot valve 15 is effective through the fluid connections 12, 23 and 82 and in the bellows chamber 91. Fluid supplied through the fluid connection 83 will pass through the restriction 95, at which the pressure is reduced, and at the reduced pressure will be available in the chamber 94. The balancing bellows will be in a condition of equilibrium with the pressure in the chambers 91, 93 and 94 equal. Fluid will discharge to the atmosphere through the discharge port 106 of the nozzle 105 in accordance with the positioning of the control surface 108 with respect thereto as determined by the balancing bellows.

The reset unit 80 when in equilibrium is thus in condition to deliver fluid through the fluid connection 17 at a pressure value which is the same as that of the pressure in the fluid connection 82. The reset unit 80 is ready to act upon a change in the controlled valve pressure.

With reset unit 80 in this condition, if then, the measured variable pressure in the fluid connection 11 increases, the controlled valve pressure in the fluid connection 12, and delivered to the valve 13, is increased in accordance with the setting of the throttling range of the controller 10. The increased controlled valve pressure is, at the same time, effective at the reset unit 80 through the fluid connections 23, 82, and 92, and in the chamber 91. The increased pressure in the chamber 91 will tend to move the bellows closure member 89 and the control surface 108 carried thereby closer to the discharge port 106 so that the discharge through the discharge port 106 is reduced and the pressure in the chamber 94 is immediately increased in accordance with the ratio of the bellows areas, and will prevent any appreciable movement of the bellows closure member 89. This increased pressure is effective through the fluid connection 17 for determining the throttling range pressure at the controller 10 and is in the same direction as and additive to the effect, at the controller 10, of the measured variable pressure. This additive effect causes a further but smaller increase in the controlled valve pressure transmitted by the pilot valve 15 and in the pressure effective through the connections 12, 23, 82 and 92 in the chamber 91, also in the same direction as before. By reason of the ratio of the effective areas of the bellows 88 and 90 the effect of a pressure change in the chamber 91 may be equalized or balanced by a much smaller change in pressure in the chamber 94. The differential of the operating pressures effective in the chambers 93 and 94 may be and is small. Upon an increase in the pressure in the chamber 94, a flow of relatively small magnitude, because of the slight difference in pressure, will occur from the chamber 94 to the chamber 93 in accordance with the setting of the needle valve 101. As this flow occurs it will gradually increase the pressure in the chamber 93 at a predetermined decreasing rate thereby permitting the pressure in the chamber 94 to rise at a like rate. The pressure in the chamber 94 thus follows and lags behind the controlled valve pressure which is the same as that in the chambers 91 and 65 while the measured variable pressure is changing with respect to the control point. The control surface 108, during these changes, remains substantially at its initial position with respect to the nozzle 105.

The gradually increasing pressure effective in the chamber 94 and therefrom through the connection 17 to the controller 10 is effective for changing the positioning of the valve 13, which action through the process, returns the measured variable pressure to the control point. As the measured variable pressure decreases the controller 10 acts to reduce the controlled valve pressure and the controlled valve pressure effective in the chamber 91 is likewise effective for reducing the pressure in the chamber 94. When the measured variable pressure returns to the control point the pressures in the chambers 91, 93 and 94 will again be equal but at a new value in accordance with the controlled valve pressure which is the same as the pressure in the chambers 91 and 65.

If, with the reset unit 80 in equilibrium condition, the measured variable pressure in the fluid connection 11 decreases, the controlled valve pressure in the fluid connection 12 and delivered to the valve 13 is decreased in accordance with the setting of the throttling range of the controller 10. The decreased controlled valve pressure is effective in the chamber 91 and will tend to move the bellows closure member 89, and the control surface 108 carried thereby, further away from the discharge port 106 so that the pressure in the chamber 94 is immediately decreased in accordance with the ratio of the bellows areas. This immediate pressure change will prevent any appreciable movement of the bellows closure member 89. A flow will occur from the chamber 93 to the chamber 94 in accordance with the setting of the needle valve 101 thereby gradually decreasing the pressure in the chamber 93 at a predetermined decreasing rate, and permitting the pressure of the chamber 94 to decrease at a like rate. The pressure in the chamber 94 thus follows and lags behind the controlled valve pressure while the measured variable pressure is changing with respect to the control point in the manner heretofore pointed out. The gradually decreasing pressure effective in the chamber 94 and therefrom through the connection 17 to the controller 10 is effective for changing the positioning of the valve 13, which action through the process returns the measured variable pressure to the control point. When the measured variable pressure is at the control point the pressures in the chambers 91, 93 and 94 will again be equal but at a new value in accordance with the controlled valve pressure. The function of the reset unit 80 is to automatically provide a regulated false atmosphere or reference pressure, the value of which is regulated by the controlled valve pressure. The controlled valve pressure effective in the fluid connection 12 is also effective in the chamber 65. The needle valve 101 permits of the adjustment of the time delay necessary for satisfactory control with changes in load.

It will be understood that the throttling range pressure effective in the chamber 55 of the controller 10 is determined by the pressure drop across the restriction 19 for either direction of flow and the pressure drop across the needle valve 71 for either direction of flow and will be in a range between the valve pressure and the reset pressure, and irrespective of which is higher. Accordingly, if pressure conditions are such that the throttling range pressure is higher than the reset pressure, fluid will flow through the connection 17 past the restriction 19 and into the chamber 94 from which it will exhaust as required through the discharge port 106 of the nozzle 105.

Figure 6:
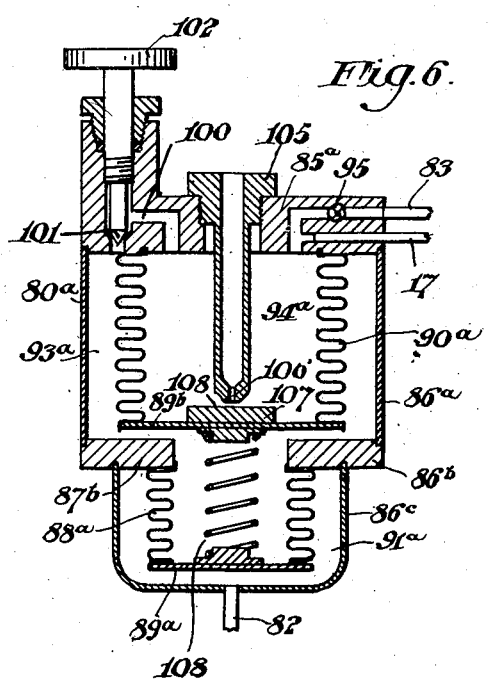
Fig. 6 is a diagrammatic view of another type of automatic reset apparatus in accordance with the present invention.

In the form of automatic reset unit 80a illustrated diagrammatically in Fig. 6, a body portion 85a is provided having housing portions 86a, 86b and 86c connected in fluidtight relationship and carried thereby. The housing portion 86b has an inwardly extending portion 87b to which flexible metallic bellows 88a is secured at one end in fluidtight relationship, the other end of the bellows 88a being closed by an end closure member 89a. A flexible metallic bellows 90a is provided, the bellows 90a being secured to the body portion 85a at one end thereof in fluidtight relationship and being closed at the other end thereof by an end closure member 89b. A fluid pressure chamber 91a is provided in the space outside the bellows 88a and within the housing portion 86c and a fluid connection 82 is in communication therewith for the delivery of the controlled valve pressure from the pilot valve 15. A fluid pressure chamber 93a is provided in the space between the bellows 90a and the housing portion 86a and within the bellows 88a. A fluid pressure chamber 94a is provided in the space within the bellows 90a. A fluid connection 83 from a source of pressure regulated and filtered fluid, such as air, is in communication with the chamber 94a through a restriction member 95. The fluid connection 17 connected to the throttling range pressure chamber 55 of the controller 10 is also in communication with the chamber 94a through a restriction 19. A connecting passageway 100 is provided in the body portion 85a between the chamber 93a and the chamber 94a and flow through this passageway 100 is controlled by the setting of a needle valve 101 in accordance with the correction rate desired. The needle valve is manually adjusted by turning the knob 102. The body portion 85a has mounted therein a nozzle 105 having a restricted discharge port 106 of predetermined size in communication with the atmosphere. The bellows closure member 89b has mounted thereon a suitable projection 107 having a flat control surface 108 arranged closely adjacent the discharge port 106 for controlling the flow through the discharge port 106 and through the interior of the nozzle member 105 to the atmosphere. The effective areas of the bellows 88a and 90a are preferably selected so that a predetermined ratio is provided. The bellows closure members 89a and 89b preferably have a light spring 108 interposed therebetween so that upon the application of pressure in the chamber 91a and against the closure member 89a a force is transmitted to the closure member 89b dependent upon the displacement of the closure member 89a. This structure permits of a greater reduction of the effect of the pressure in the chamber 91a than can be obtained with the form of reset unit illustrated in Figs. 2, 3, 4 and 5. A still lower differential of the operating pressures in the chambers 93a and 94a is thereby made available.

The mode of operation of the automatic reset unit 80a illustrated in Fig. 6 is substantially the same as heretofore set forth in connection with the automatic reset unit 80 but provides a greater reduction of the effect of the controlled valve pressure acting thereon, and permits using a coarser or less critical needle valve 101 for the same correction.

With the bellows 88a and 90a at equilibrium positions, upon a change in the controlled valve pressure effective in the fluid connection 82 this change is effective on the bellows closure member 89a in the chamber 91a, displacing the member 89a, and changes the force exerted by the spring 108 on the bellows closure member 89b. This tends to change the position of the control surface 108 with respect to the discharge port 106 of the nozzle 105 and thereby brings about a change of the pressure in the chamber 94a. The pressure change in the chamber 94a is followed by a change in the pressure in the chamber 93a and the direction of flow will be dependent upon whether the pressure in the chamber 93a or 94a is higher. The pressure prevailing in the chamber 94a will thus gradually increase or decrease in the manner heretofore pointed out, so long as the measured variable pressure is away from the control point. Upon the return of the measured variable pressure the balancing bellows will be rebalanced substantially at their initial equilibrium positions but at a higher or lower value as heretofore pointed out.

The use of a small differential pressure across the balancing bellows and between the chambers 93 and 94 or 93a and 94a permits of adjustment of the needle valve 101 as desired and avoids the necessity for extremely critical positioning of the needle valve 101. The provisions for repositioning or retaining the balancing bellows at their equilibrium positions permits using the bellows and detector nozzles to optimum advantage and the use of a separate source of pressure regulated fluid avoids interference with other parts of the control system.

I claim:

1. In pressure fluid control apparatus, a source of fluid under pressure, means responsive to a plurality of pressures including a measured variable pressure for controlling the pressure of the fluid from said source, and means for modifying the action of said responsive means, said last means including another source of fluid under pressure, a fluid connection between said responsive means and said modifying means, a movable member responsive to the controlled pressure for controlling the pressure of the fluid from said other source available through said fluid connection to said responsive means, and means for controlling the rate of change of the pressure from said other source.

2. In pressure fluid control apparatus, a source of fluid under pressure, a controller for controlling the pressure of the fluid from said source comprising means responsive to a plurality of pressures including a measured variable pressure, the controlled pressure and a throttling range determining pressure, and means for varying said throttling range pressure including another source of fluid under pressure, and a member responsive to the controlled pressure for controlling the pressure of the fluid from said other source.

3. In pressure fluid control apparatus, a casing, two spaced concentric bellows in said casing providing with said casing a plurality of pressure chambers, means carried by said bellows and movable therewith upon the application of pressure in said chambers, one of said chambers having a connection for the introduction of pressure fluid from a pressure regulated source through a fixed restriction, discharge controlling orifice means connected to said chamber and controlled by said movable means for regulating the pressure conditions in said chamber, a second of said chambers having a connection for the introduction of controlled pressure fluid in opposition to said first pressure fluid, and a third of said chambers in which pressure is operative in the same direction as said second chamber and connected to said first chamber by a passageway, and means for regulating the flow through said passageway.

4. In pressure fluid control apparatus, a casing, flexible metallic bellows in said casing providing with said casing a pressure chamber, said chamber having a connection for the introduction of controlled pressure fluid for actuating said bellows, another flexible metallic bellows in said casing providing with said casing and said other bellows two other pressure chambers, a source of pressure regulated fluid, a connection for the delivery of pressure fluid from said source through a restriction into one of said other pressure chambers and discharge controlling means connected thereto and controlled by the positioning of said bellows, a passageway between said other pressure chambers, means for regulating the flow through said passageway, connecting means between said bellows, and a fluid connection from one of said other chambers for transfer of pressure fluid at the pressure prevailing therein.

5. In pressure fluid control apparatus, a casing, flexible metallic bellows in said casing providing with said casing a pressure chamber, said chamber having a connection for the introduction of controlled pressure fluid for actuating said bellows, another flexible metallic bellows in said casing providing with said casing and said other bellows two other pressure chambers, a source of pressure regulated fluid, a connection for the delivery of pressure fluid from said source through a restriction into one of said other pressure chambers and discharge controlling means connected thereto and controlled by the positioning of said bellows, a passageway between said other pressure chambers, means for regulating the flow through said passageway, a resilient connection between said bellows, and a fluid connection from one of said other chambers for transfer of pressure fluid at the pressure prevailing therein.

6. In pressure fluid control apparatus, a casing, flexible metallic bellows in said casing providing with said casing a pressure chamber, said chamber having a connection for the introduction of controlled pressure fluid for actuating said bellows, another flexible metallic bellows in said casing providing with said casing and said other bellows two other pressure chambers, a source of pressure regulated fluid, a connection for the delivery of pressure fluid from said source through a restriction into one of said other pressure chambers and discharge controlling means connected thereto and controlled by the positioning of said bellows, a passageway between said other pressure chambers, means for regulating the flow through said passageway for regulating the rate of pressure adjustment between said chambers, a resilient connection between said bellows, and a connection from the first of said other chambers for transfer of pressure fluid at the pressure prevailing therein.

7. In pressure fluid control apparatus, a source of fluid under pressure, means responsive to a measured variable for controlling the pressure of the fluid from said source, and means for modifying the action of said responsive means, said last means including another source of fluid under pressure and a movable pressure responsive member for controlling the pressure of the fluid from said other source, said pressure responsive member being responsive to the controlled pressure from said other source, a fluid connection between said responsive means and the controlled pressure from said second source, a second fluid connection in communication with said modifying means and the controlled pressure from said first source, and means for controlling the rate of change of the pressure from said other source.

8. In pressure fluid control apparatus, a first source of fluid under pressure, means responsive to a measured variable for controlling the pressure of the fluid from said first source, said responsive means having a movable pressure responsive portion, a second source of fluid under pressure, a pressure responsive member for controlling the pressure of the fluid from said second source, a fluid connection having a restriction therein for applying the controlled pressure of the fluid from said second source against said pressure responsive portion, and another fluid connection having a restriction therein and in communication with said pressure responsive portion and with the controlled pressure from said first source.

9. In pressure fluid control apparatus, a first source of fluid under pressure, means responsive to a measured variable for controlling the pressure of the fluid from said first source, said responsive means having a movable pressure responsive portion, means for modifying the action of said responsive means including a second source of fluid under pressure and a pressure responsive member for controlling the pressure of the fluid from said second source, a fluid connection having a restriction therein for applying the controlled pressure of the fluid from said second source against said pressure responsive portion, a second fluid connection having a restriction therein and in communication with said pressure responsive portion and with the controlled pressure from said first source, and a third fluid connection in communication with the controlled pressure from said first source and said modifying means.

COLEMAN B. MOORE.

REFERENCES CITED

The following references are of record in the file of this patent:

UNITED STATES PATENTS

| Number | Name | Date |
|---|---|---|
| 2,098,914 | Gorrie | Nov. 9, 1937 |
| 2,232,219 | Dueringer | Feb. 18, 1941 |
| 2,265,114 | Hartley | Dec. 2, 1941 |
| 2,290,987 | Moore | July 28, 1942 |
| 2,312,201 | Thompson | Feb. 23, 1943 |
| 2,360,889 | Philbrick | Oct. 24, 1944 |
| 2,381,948 | Gess | Aug. 14, 1945 |